United States Patent
Landis et al.

(10) Patent No.: US 11,838,908 B2
(45) Date of Patent: Dec. 5, 2023

(54) SHORT CONTROL MESSAGES USING INDEX MODULATION ON DEMODULATION REFERENCE SIGNALS

(71) Applicant: QUALCOMM Incorporated, San Diego, CA (US)

(72) Inventors: Shay Landis, Hod Hasharon (IL); Assaf Touboul, Netanya (IL); Gideon Kutz, Ramat Hasharon (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/194,140

(22) Filed: Mar. 5, 2021

(65) Prior Publication Data

US 2022/0287016 A1 Sep. 8, 2022

(51) Int. Cl.
*H04W 72/20* (2023.01)
*H04L 5/00* (2006.01)
*H04L 41/0806* (2022.01)
*H04W 72/0453* (2023.01)

(52) U.S. Cl.
CPC .......... *H04W 72/20* (2023.01); *H04L 5/0048* (2013.01); *H04L 41/0806* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2013/0155921 A1* | 6/2013 | Gomadam | H04K 1/02 370/310 |
| 2016/0006550 A1* | 1/2016 | Cheng | H04L 5/0051 370/254 |
| 2016/0112994 A1* | 4/2016 | Wang | H04L 25/0226 370/329 |
| 2018/0184426 A1* | 6/2018 | Li | H04W 72/04 |
| 2019/0089560 A1* | 3/2019 | Baldemair | H04W 72/0453 |
| 2019/0215849 A1* | 7/2019 | Ye | H04L 5/0094 |
| 2020/0059337 A1* | 2/2020 | Yamada | H04L 27/2613 |
| 2021/0014023 A1* | 1/2021 | Zheng | H04L 5/0044 |

* cited by examiner

*Primary Examiner* — Alpus Hsu
*Assistant Examiner* — Camquyen Thai
(74) *Attorney, Agent, or Firm* — Arun Swain

(57) ABSTRACT

This disclosure provides systems, methods, and devices for wireless communication that support short control messaging using index modulation on DMRS. In a first aspect, a method of wireless communication includes a base station determining a configuration action for a served user equipment (UE) in communication with the base station. The base station may then generate a short control message associated with the configuration action and map that short control message onto a set of inactive subcarrier resource elements (REs) of a demodulation reference signal (DMRS) sequence. The served UE may then receive the transmitted DMRS sequence and determine the short control message within the set of inactive subcarrier REs of the DMRS sequence. Other aspects and features are also claimed and described.

48 Claims, 10 Drawing Sheets

SHORT CONTROL MESSAGES USING INDEX MODULATION ON DEMODULATION REFERENCE SIGNALS

TECHNICAL FIELD

Aspects of the present disclosure relate generally to wireless communication systems, and more particularly, to control messages. Some features may enable and provide improved communications, including short control messages using index modulation on demodulation reference signals (DMRS).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes determining, by the base station, a configuration action for a served user equipment (UE) in communication with the network node, generating, by the base station, a short control message associated with the configuration action, mapping, by the base station, the short control message onto a set of inactive subcarrier resource elements (REs) of a demodulation reference signal (DMRS) sequence, and transmitting, by the base station, the DMRS sequence to the served UE, wherein the DMRS sequence includes the short control message within the set of known inactive subcarrier REs of the DMRS sequence.

In an additional aspect of the disclosure, an apparatus configured for wireless communication is disclosed. The apparatus includes at least one processor, and a memory coupled to the at least one processor. The at least one processor is configured to determine, by the base station, a configuration action for a served UE in communication with the network node, to generate, by the base station, a short control message associated with the configuration action, to map, by the base station, the short control message onto a set of inactive subcarrier REs of a DMRS sequence, and to transmit, by the base station, the DMRS sequence to the served UE, wherein the DMRS sequence includes the short control message within the set of known inactive subcarrier REs of the DMRS sequence.

In an additional aspect of the disclosure, an apparatus configured for wireless communication is disclosed. The apparatus includes means for determining, by the base station, a configuration action for a served UE in communication with the network node, means for generating, by the base station, a short control message associated with the configuration action, means for mapping, by the base station, the short control message onto a set of inactive subcarrier REs of a DMRS sequence, and means for transmitting, by the base station, the DMRS sequence to the served UE, wherein the DMRS sequence includes the short control message within the set of known inactive subcarrier REs of the DMRS sequence.

In an additional aspect of the disclosure, a non-transitory computer-readable medium stores instructions that, when executed by a processor, cause the processor to perform operations including determining, by the base station, a configuration action for a served UE in communication with the network node, generating, by the base station, a short control message associated with the configuration action, mapping, by the base station, the short control message onto a set of inactive subcarrier REs of a DMRS sequence, and transmitting, by the base station, the DMRS sequence to the served UE, wherein the DMRS sequence includes the short control message within the set of known inactive subcarrier REs of the DMRS sequence.

In an additional aspect of the disclosure, a method of wireless communication performed by a user equipment (UE) is disclosed. The method includes receiving, by the UE, a DMRS from a transmitting base station, identifying, by the UE, a short control message within a set of expected inactive subcarrier REs of a known sequence of the DMRS, wherein the short control message is associated with the configuration action of the network node, and adjusting, by the UE, a configuration of the configuration action using control information from the short control message.

In an additional aspect of the disclosure, an apparatus configured for wireless communication is disclosed. The apparatus includes at least one processor, and a memory coupled to the at least one processor. The at least one processor is configured to receive, by the UE, a DMRS from a transmitting base station, to identify, by the UE, a short control message within a set of expected inactive subcarrier REs of a known sequence of the DMRS, wherein the short control message is associated with the configuration action of the network node, and to adjust, by the UE, a configuration of the configuration action using control information from the short control message.

In an additional aspect of the disclosure, an apparatus configured for wireless communication is disclosed. The apparatus includes means for receiving, by the UE, a DMRS from a transmitting base station, means for identifying, by the UE, a short control message within a set of expected inactive subcarrier REs of a known sequence of the DMRS, wherein the short control message is associated with the configuration action of the network node, and means for adjusting, by the UE, a configuration of the configuration action using control information from the short control message.

In an additional aspect of the disclosure, a non-transitory computer-readable medium stores instructions that, when executed by a processor, cause the processor to perform operations including receiving, by the UE, a DMRS from a transmitting base station, identifying, by the UE, a short control message within a set of expected inactive subcarrier REs of a known sequence of the DMRS, wherein the short control message is associated with the configuration action of the network node, and adjusting, by the UE, a configuration of the configuration action using control information from the short control message.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
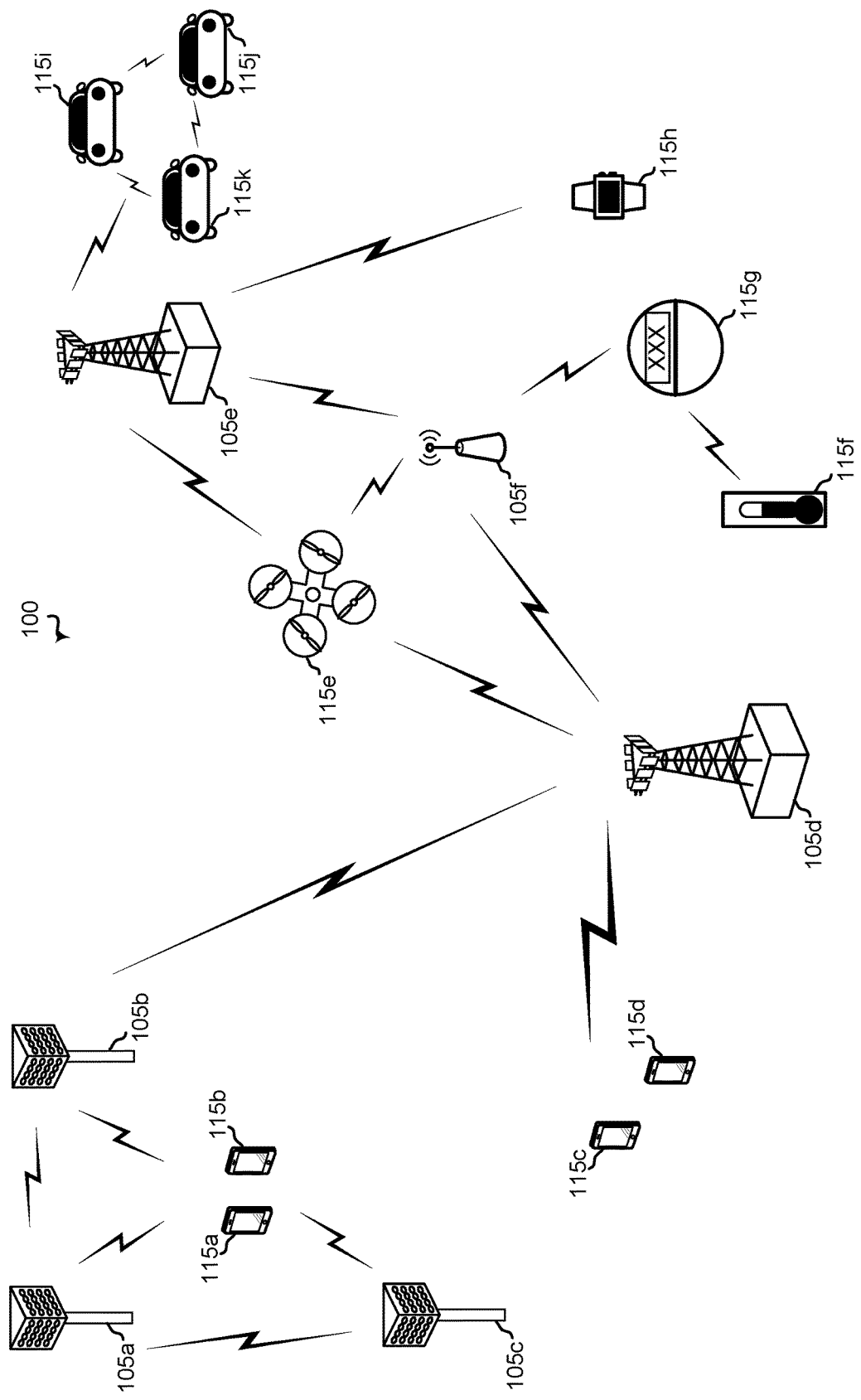
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support short control messaging using index modulation on DMRS.

Particular implementations of the subject matter described in this disclosure may be implemented to realize one or more of the following potential advantages or benefits. In some aspects, the present disclosure provides techniques for communicating short control messaging over DMRS. In so doing, the various aspects of the present disclosure allow the expansion of existing control schemes in 5G NR operations without adding further complexity of downlink control signaling. For example, no additional downlink control information (DCI) signaling is created, which does not increase the number of blind decodings at a UE. Additional aspects for communicating short control messaging over DMRS allows for short control messages to be provided to UEs with low latency and low overhead, which may benefit to operations or actions, such as beam management, power management, configuration of analog-to-digital (ADC) bits, dynamic configuration of slot structure, and the like.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, or backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
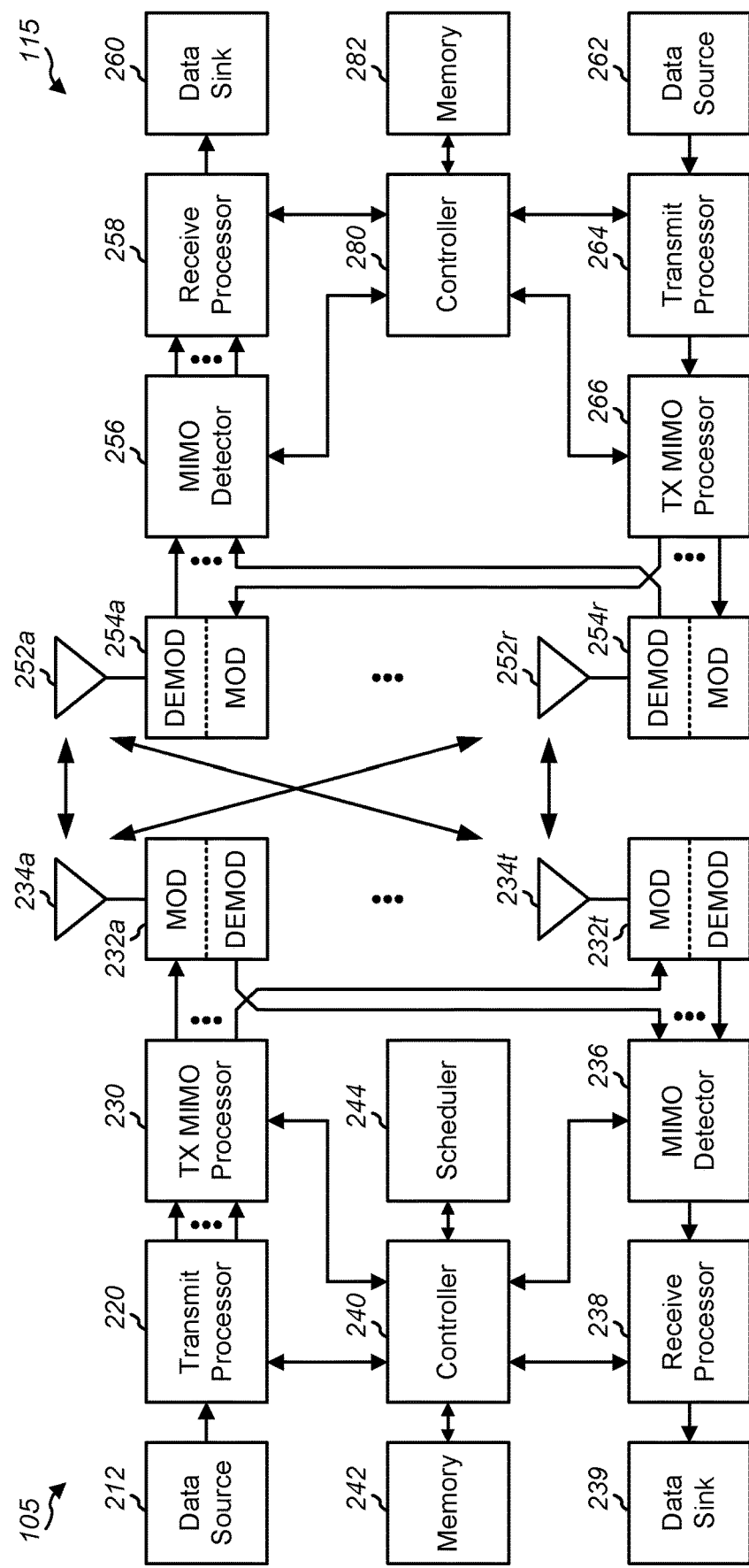
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5A and 5B, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

There are many types of control messages defined in 5G NR communications operations. Considerations of 5G NR operations in higher frequency bands (e.g., FR2, FR4, FR5, etc.) have been directed at beam management (BM) improvements and suggest the introduction of more downlink control information (DCI)-based beam management control, instead of the legacy medium access control-control element (MAC-CE) and radio resource control (RRC) signaling configuration. Such DCI-based beam management may reduce latency overhead associated with beam management. However, creating additional DCI types may result in increased complexity for UE processing, such as through a corresponding increase in blind decodings.

According to current 5G NR operations, the minimum bit length of a physical downlink control channel (PDCCH) DCI is 12-bits. Such limit is driven by the use of Polar codes. Where a control message does not require 12-bits, padding would be added to the DCI, which wastes resources. Beam management control signaling generally include smaller message length. Therefore, it would be useful to convey smaller control messages (e.g., for beam management control) without use DCI-base signaling. Various aspects of the present disclosure suggest using index modulation (IM) on DMRS to convey such short messages.

Figure 3:
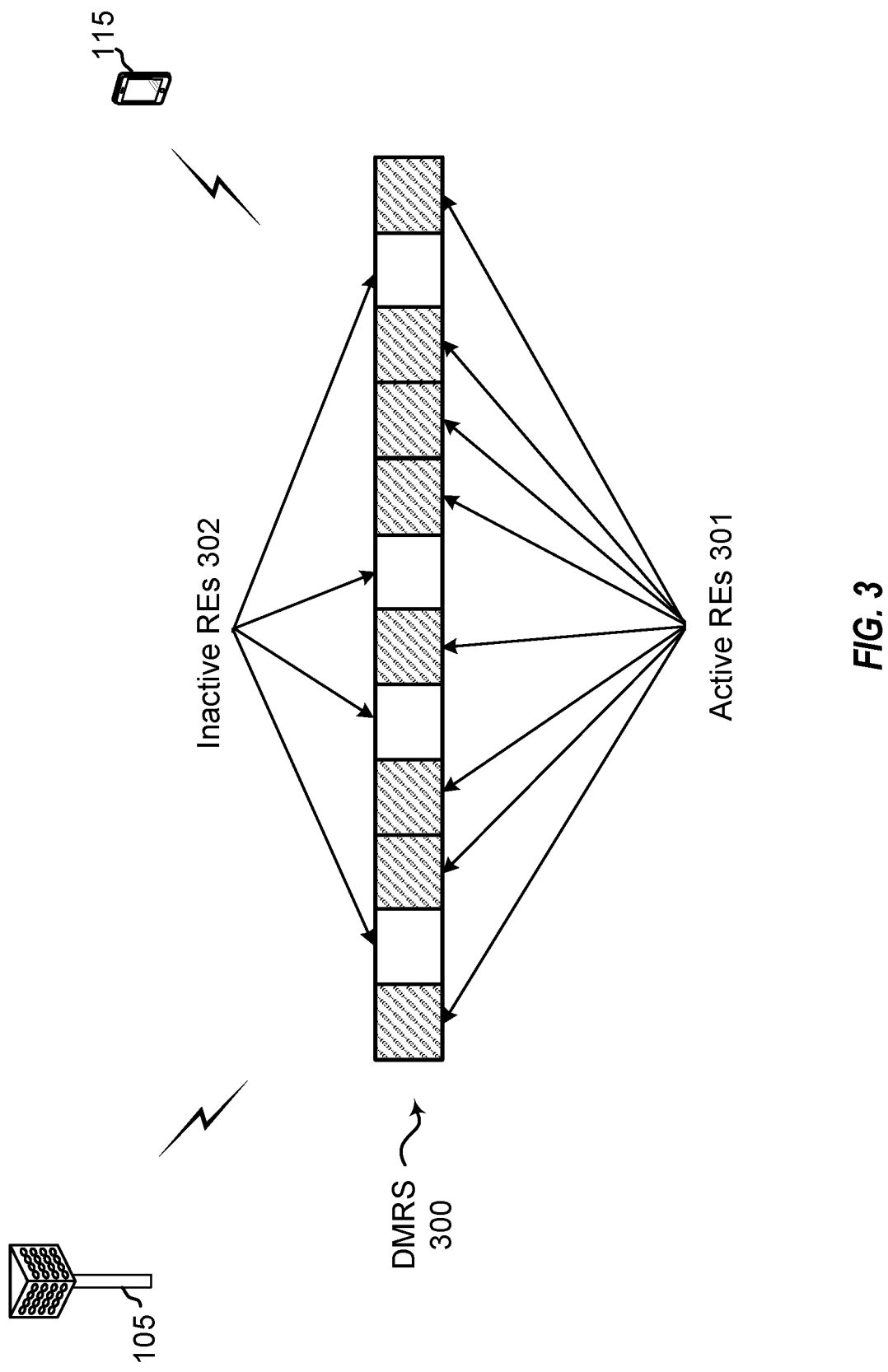
FIG. 3 is a block diagram illustrating demodulation reference signal (DMRS) characteristics transmitted between a base station and UE for channel estimation.

FIG. 3 is a block diagram illustrating demodulation reference signal (DMRS) characteristics transmitted between a base station 105 and UE 115 for channel estimation. In conventional OFDM-IM operations, the bitstream of the downlink physical downlink shared channel (PDSCH) DMRS is split into a subcarrier index selection and an M-ary constellation. DMRS 300 is illustrated having 12 resource elements (REs) within the transmission bitstream. A subset of available subcarriers are active according to the particular subcarrier index selection, while the remaining subcarriers of the bitstream are inactive. Thus, DMRS 300 includes active REs 301 and inactive REs 302. Active REs may be modulated, as in conventional OFDM. The number of added channel bits due to IM is defined according to $\lfloor \log_2(_K^N) \rfloor$, where K represents the number of active subcarriers and N represents the total allocated number of subcarriers. DMRS 300, which is transmitted by base station 105, may be used by UE 115 for channel estimation. According to various aspects of the present disclosure, a base station, such as base station 105, may add signaling, such as a DMRS pilot or other known or predetermined waveform, into the inactive REs that allows the DMRS to carry information to UE 115.

Figure 4:
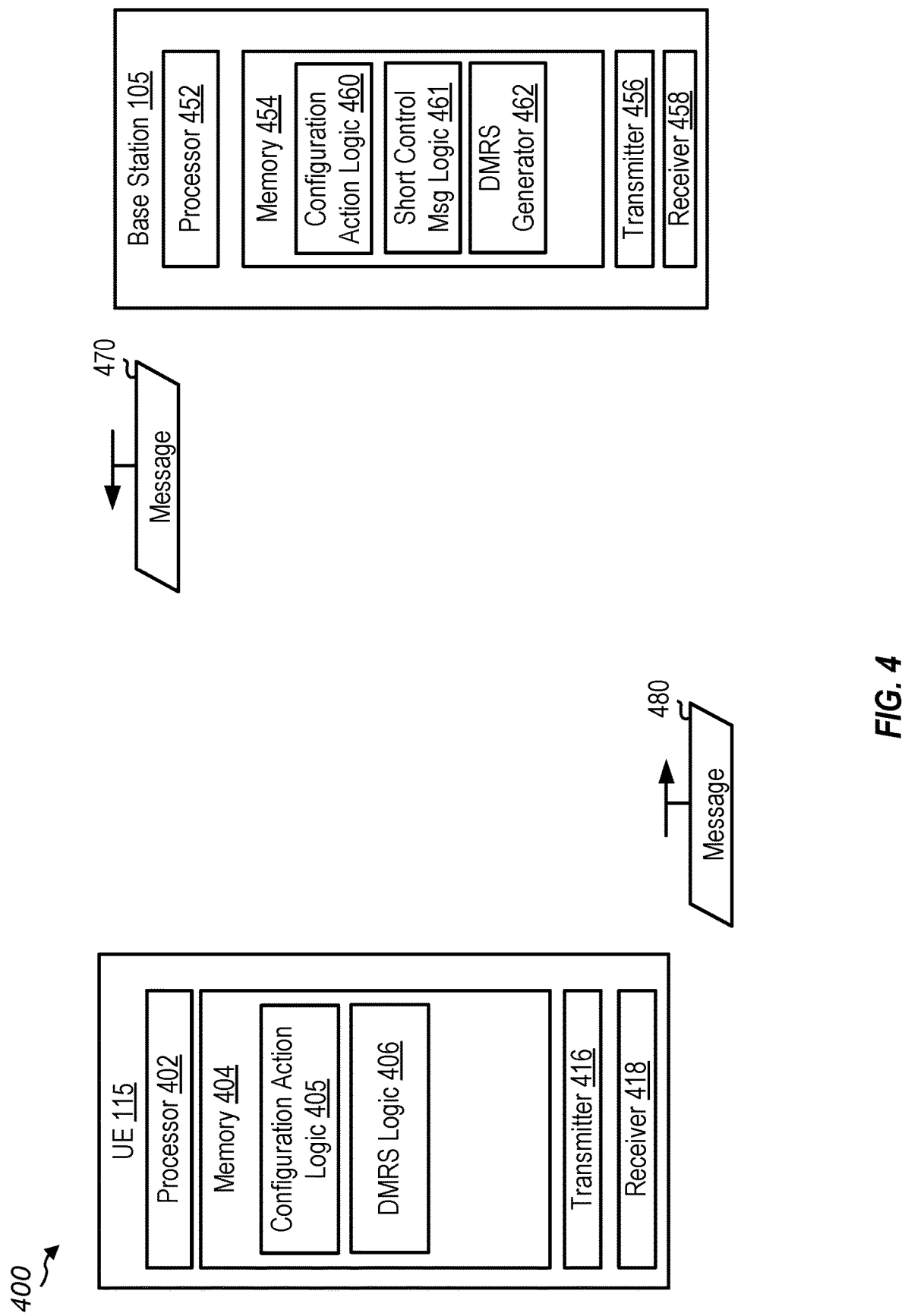
FIG. 4 is a block diagram illustrating an example wireless communication system that supports short control messaging using index modulation on DMRS according to one or more aspects.

FIG. 4 is a block diagram of an example wireless communications system 400 that supports short control messaging using index modulation on DMRS according to one or more aspects of the present disclosure. In some examples, wireless communications system 400 may implement aspects of wireless network 100. Wireless communications system 400 includes UE 115 and base station 105. Although one UE 115 and one base station 105 are illustrated, in some other implementations, wireless communications system 400 may generally include multiple UEs 115, and may include more than one base station 105.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). Processor 452 may be configured to execute instructions stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store various logic or code that, on execution by processor 452 enables the functionalities and capabilities of base station 105 and includes, among other such logic or code, configuration action logic 460, short control message logic 461, and DMRS generator 462.

Transmitter 456 is configured to transmit reference signals, such as DMRS, synchronization signals, control information and data to one or more other devices, and receiver 458 is configured to receive reference signals, control information and data from one or more other devices. For example, transmitter 456 may transmit signaling, control information and data (collectively represented as message 470) to, and receiver 458 may receive signaling, control information and data (collectively represented as message 480) from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). Processor 402 may be configured to execute instructions stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store various logic or code that, on execution by processor 402 enables the functionalities and capabilities of UE 115 and includes, among other such logic or code, configuration action logic 406 and DMRS logic 407.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP.

During operation of wireless communications system 400, base station 105 may determine configuration information for UE 115 for a configuration action. As described herein, a configuration action may include various actions and activities of UE 115 that may be controlled or configured using information or message that may be provided using a short message, such as a message of less than 10 bits. Such actions and activities may include, but are not limited to, beam management, power management, configuration of analog-to-digital (ADC) bits, dynamic configuration of slot structure, and the like. Base station 105 may identify and compile such information through execution of configuration action logic 460 by processor 452. In order to convey this configuration information to UE 115, base station 105, under control of processor 452 and within the functionality provided in execution of configuration action logic 460, may further execute short control message logic 461, which enables the capability of base station 105 to formulate the short control message with the configuration information. In further execution of DMRS generator 461 by processor 452, base station 105 may modulate or map the short control message onto the REs that would previously had been inactive REs of the DMRS sequence formulated by the subcarrier index. Base station 105 may include signaling waveforms, such as DMRS pilots, on the previously-inactive REs in order to create the signaling REs within the DMRS sequence for delivering the short control message, in addition to the active REs within the DMRS sequence for channel estimation. Base station 105 may then transmit such DMRS with short control message (represented on FIG. 4 as message 470) to UE 115 via transmitter 456.

UE 115 may receive the DMRS with short control message via receiver 418. In order to enable the functionalities and capabilities for receiving a DMRS with short control messaging and extracting the short control message from the DMRS, UE 115 executes configuration action logic 405 and DMRS logic 406 by processor 402. The enabled functionality allows UE 115 to correlate the known sequence under different hypothesis for the signal location in order to identify the short control message within the DMRS sequence within the REs that would previously had been inactive REs. Upon extracting the configuration information, UE 115 may use the information for updating the action or activity associated with the configuration action.

As described with reference to FIG. 4, the present disclosure provides techniques for short control messaging using index modulation on DMRS. The various aspect of the present disclosure may describe index modulation on front loaded (e.g., $1^{st}$ or $2^{nd}$ symbol) PDSCH DMRS to convey short control messages. Current configurations of DMRS carry no information. The various aspects of the present disclosure allow the expansion of existing control schemes in 5G NR operations without adding further complexity of downlink control signaling. For example, no additional DCI signaling is created, which keeps the number of blind decodings from increasing at a UE. Additional aspect for communicating short control messaging over DMRS allows for short control messages to be provided to UEs with low latency and low overhead, which may benefit to operations, such as beam management, power management, configuration of ADC bits, dynamic configuration of slot structure, and the like.

Figure 5A:
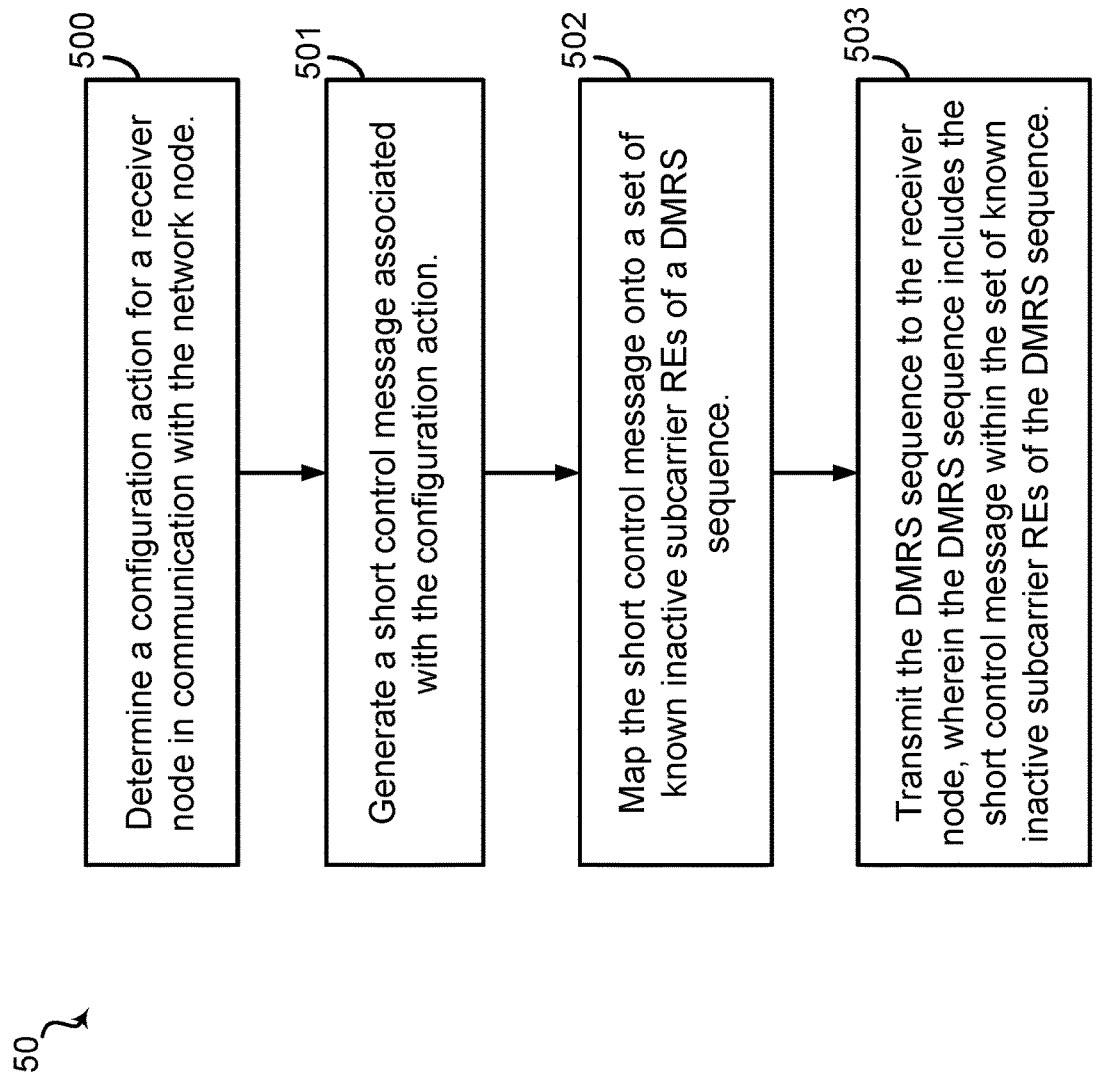
FIGS. 5A and 5B are block diagrams illustrating example blocks implemented to support short control messaging using index modulation on DMRS according to one or more aspect.

FIG. 5A block diagrams illustrating example blocks implemented by a base station to support short control messaging using index modulation on DMRS according to one or more aspects. The example blocks of process 51 will also be described with respect to UE 115 as illustrated in FIGS. 1, 2, 4, 6, 7, and 8. FIG. 8 is a block diagram of an example base station 105 that supports short control messaging on DMRS according to one or more aspects. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 800*a-t* and antennas 234*a-t*. Wireless radios 800*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 500, a base station determines a configuration action for a receiver node in communication with the network node. A base station, such as base station 105 may be configured with capabilities of managing various actions of served UEs. Base station 105 would provide configuration control to the served UEs so that the UEs can adjust such configuration actions based on the control information received from base station. In order to manage this feature, base station 105, under control of controller/processor 240, configuration action logic 801, stored in memory 242. Executing the steps and instructions of configuration action logic 801 provides base station 105 with the capability to determine which configuration action is being implemented or used by a served UE and determine what configuration control information should be provided to allow the served UE to control or modify the particular configuration action. A configuration action may include various different functionality that may include actions, such as beam management, power management, adaptive DMRS, dynamic configuration of slot structure, configuration of ADC bits, and the like. Each such action may be controlled using a control message having fewer than 10 bits. The execution of the steps and instructions of configuration action logic 801 provide the functionality to base station 105 and is referred to herein as "the execution environment" of configuration action logic 801.

At block 501, the base station generates a short control message associated with the configuration action. Under control of controller/processor 240, base station 105 executes short control message logic 802, stored in memory 242. Within the execution environment of short control message logic 802, base station 105 may create the configuration information to be included within a short control message for modulation onto a DMRS.

At block 502, the base station maps the short control message onto a set of known inactive subcarrier REs of a DMRS sequence. Base station 105 may generate a DMRS by executing DMRS generator 803, under control of controller/processor 240, stored in memory 242. The execution environment of DMRS generator 803 may be used in conjunction with the execution environment of short control message logic 802 to provide the functionality to base station 105 for mapping the short control message having fewer than 10 bit for the configuration action onto the set inactive subcarrier REs created by the selected subcarrier index of the DMRS sequence by imparting a known signal, such as DMRS pilots, onto the REs which would otherwise have been inactive. The mapped short control message included in the signaling REs of the DMRS may then be used for instructing the configuration action, along with the active REs used for channel estimation.

At block 503, the base station transmits the DMRS sequence to the receiver node, wherein the DMRS sequence includes the short control message within the set of known inactive subcarrier REs of the DMRS sequence. Within the execution environment of DMRS generator 803 in conjunction with the execution environment of short control message logic 802, base station 105 may then transmit the DMRS that has the short control message mapped into the expected inactive REs of the DMRS sequence. Base station 105 transmits the modified DMRS via wireless radios 800*a-t* and antennas 234*a-t*.

In some implementations, base station 105 may generate the DMRS with the short control message using regular spacing between REs of the sequence of signaling REs of the DMRS. Base station 105 would select the initial offset for setting the first signaling RE, which may allow defining the information making up the short control message for the remaining, regularly-spaced REs and the other active REs to be used for channel estimation. The parameter of the regular spacing between the REs may be communicated to the UE. The UE, however, determines and identifies the offset, which defines or carriers the information of the short control message.

In some implementations, base station 105 may select the initialization seed for generating the DMRS in order to define the DMRS sequences, such as the active RE sequence for channel estimation and the signaling RE sequence to contain the short control message. On receipt of the transmitted DMRS, the UE will determine or identify the initialization seed, which defines or carriers the information of the short control message.

Figure 5B:
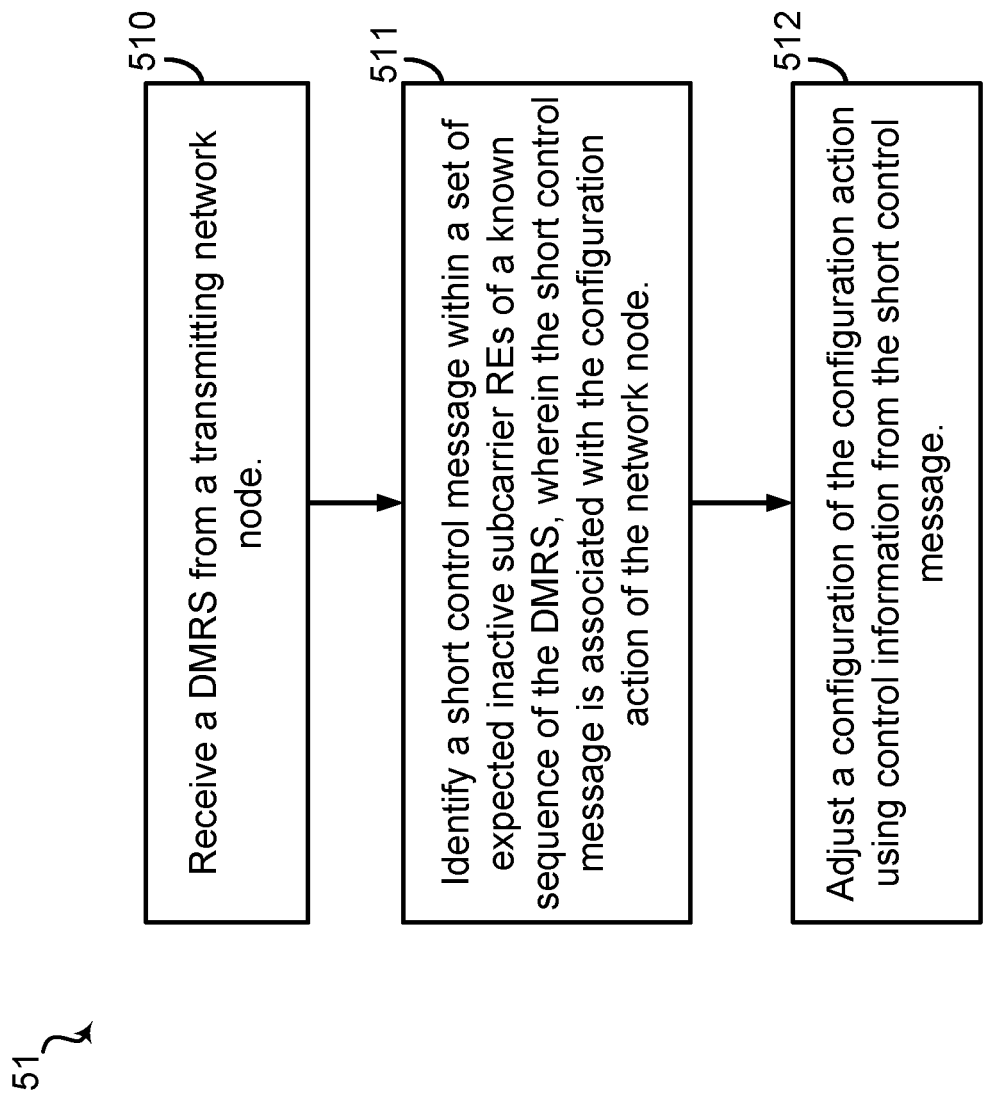
Figure 9:
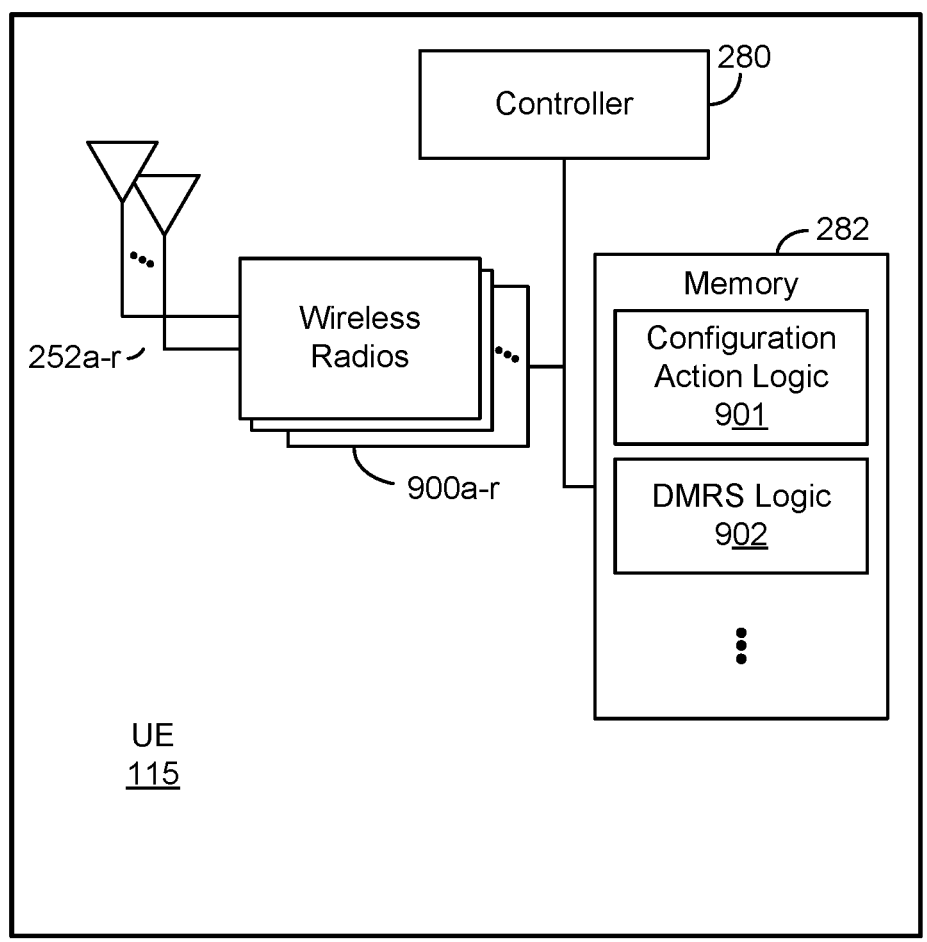
FIG. 9 is a block diagram of an example UE that supports short control messaging using index modulation on DMRS according to one or more aspects.

FIG. 5B block diagrams illustrating example blocks implemented by a UE to support short control messaging using index modulation on DMRS according to one or more aspects. The example blocks of process 51 will also be described with respect to UE 115 as illustrated in FIGS. 1, 2, 4, 6, 7, and 9. FIG. 9 is a block diagram of an example UE 115 that supports short control messaging on DMRS according to one or more aspects. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900*a-r* and antennas 252*a-r*. Wireless radios 900*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 510, a UE receives a DMRS from a transmitting network node. A UE, such as UE 115, executes, under control of controller/processor 280, receives signaling via antennas 252*a-r* and wireless radios 900*a-r*. Further under control of controller/processor 280, UE 115 executes DMRS logic 902. The executions environments of DMRS logic 902 allows UE 115 to determine that the received signaling is a DMRS.

At block 511, the UE identifies a short control message within a set of expected inactive subcarrier REs of a known sequence of the DMRS, wherein the short control message is associated with the configuration action of the network node. Further under control of controller/processor 280, UE 115 executes configuration action logic 901. The combination of executions environments of configuration action logic 901 and DMRS logic 902 allows UE 115 to determine that the received DMRS includes a short control message. UE 115 may correlate the signaling to determine which REs of the DMRS includes the signaling REs for the short control message and the active REs of the DMRS for channel estimation.

At block 512, the UE adjusts a configuration of the configuration action using control information from the short control message. Within the execution environment of configuration action logic 901, UE 115 may use the configuration information included within the short control message of the received DMRS to adjust the configuration action.

In some implementations, a UE, such as UE 115, receiving the PDSCH DMRS from a serving base station may know that the signaling REs sequence within the sequence of DMRS includes regular spacing. UE 115 may determine or identify the offset for the first signaling RE in order to determine the content of the short control message. Once the offset has been determined, the regular spacing allows UE 115 to more easily correlate the next RE of the signaling REs sequence.

In some implementations, a UE, such as UE 115, receives the PDSCH DMRS from a serving base station and performs correlation of the signals based on varying the initialization seed for identifying the DMRS sequence. The determination of the initialization seed by UE 115 that was used by the serving base station to generate the DMRS sequence allows UE 115 to define the information content of the short control message.

Figure 6:
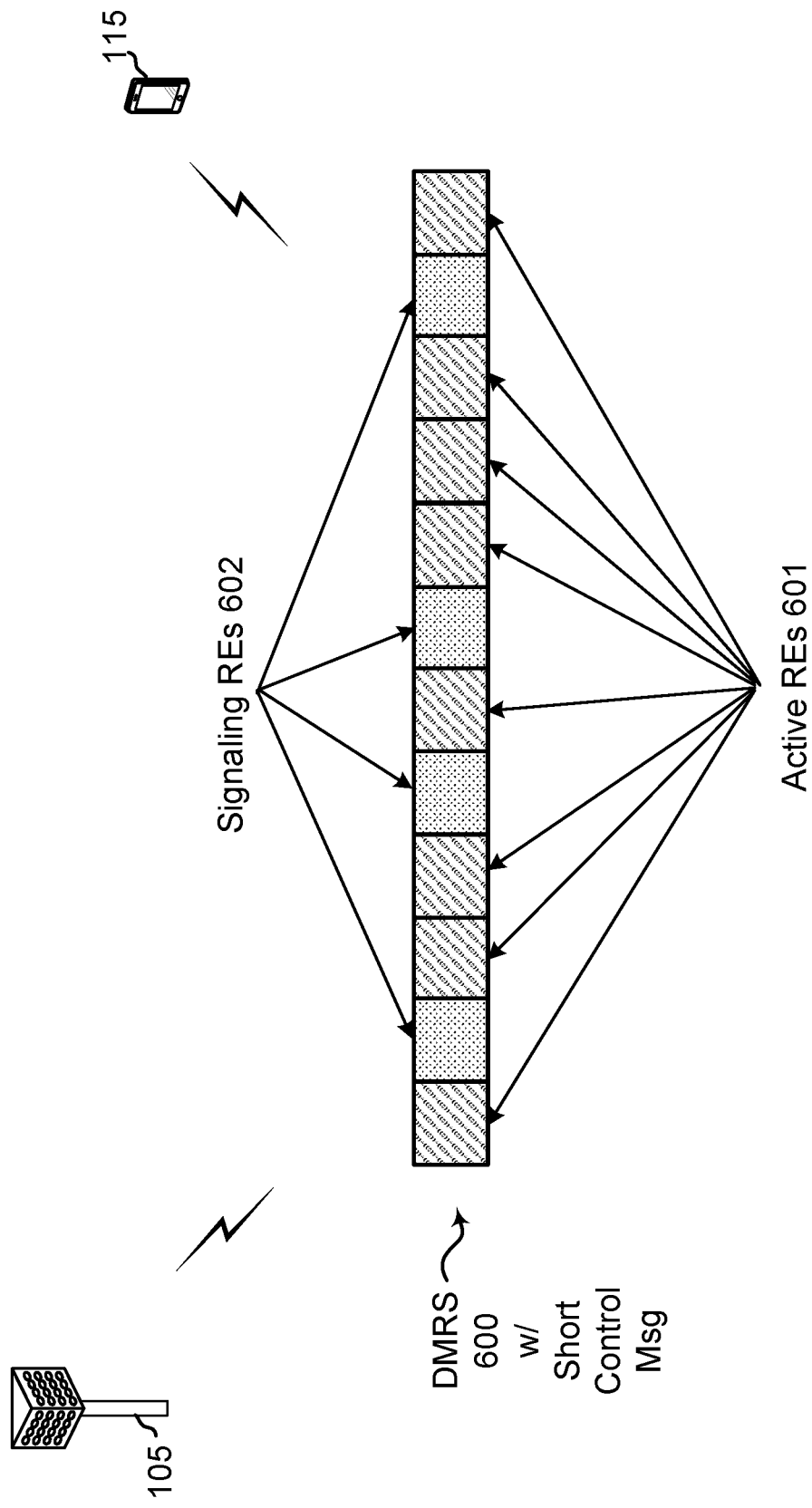
FIG. 6 is a block diagram illustrating DMRS characteristics transmitted between a base station and UE that provides short control messaging using index modulation on DMRS according to one or more aspects of the present disclosure.

FIG. 6 is a block diagram illustrating DMRS characteristics transmitted between a base station 105 and UE 115 that provides short control messaging using index modulation on DMRS according to one or more aspects of the present disclosure. Base station 105 may intend to provide configuration information to address a particular configuration action at UE 115. As noted above, the configuration action may include beam management, power management, adaptive DMRS, dynamic configuration of slot structure, configuration of ADC bits, and the like. This configuration action may be addressed with a message having fewer than 10 bits. According to the illustrated aspect of the present disclosure, instead of generating DMRS 600 to have inactive REs along with active REs 601, base station 105 generates DMRS 600 using signaling REs 602. Signaling REs 602 may include a known signal, such as a DMRS pilot, in the REs that are not used by the OFDM-IM. Because DMRS pilots are known waveforms, UE 115 may correlate the known sequence of signaling REs 602 under different hypothesis for the signal location. The maximal correlation by UE 115 may be expected at the correct signal location pattern of signaling REs 602. As UE 115 correlates signaling REs 602, UE 115 may then determine or identify the short control message included within signaling REs 602 of DMRS 600.

It should be noted that the number of available correlations may grow as the number of control data increases. However, the small control packets for the intended configuration action may be limited to fewer than 10 bits so that the complexity of correlating signals at UE 115 will not increase to a burdensome level for UE 115 that could affect user experience.

One implementation for designing the generation of DMRS with a short control message may provide less complexity by selecting or varying the initialization seeds in order to control the resulting sequence of the DMRS. For example, with reference to FIG. 6, base station 105 may select an initialization seed in order to generate the sequence of DMRS 600 that includes the sequence of active REs 601 and the sequence of signaling REs 602. A DMRS, such as DMRS 600 may be generated using an initialization seed value. This initialization seed value may be used to generate a scrambling sequence. The scrambling sequence may then be modulated, resulting in the sequence of active REs 601 that makes up the bitstream of DMRS 600 for channel estimation and the corresponding sequence of signaling REs 602 that may include the short control message for UE 115. UE 115 may correlate the received DMRS 600 with the different possible sequences arising from the different initialization seeds. Because the short control message is intended to convey data using fewer than 10 bits, the number of possible sequences will not be large.

Figure 7:
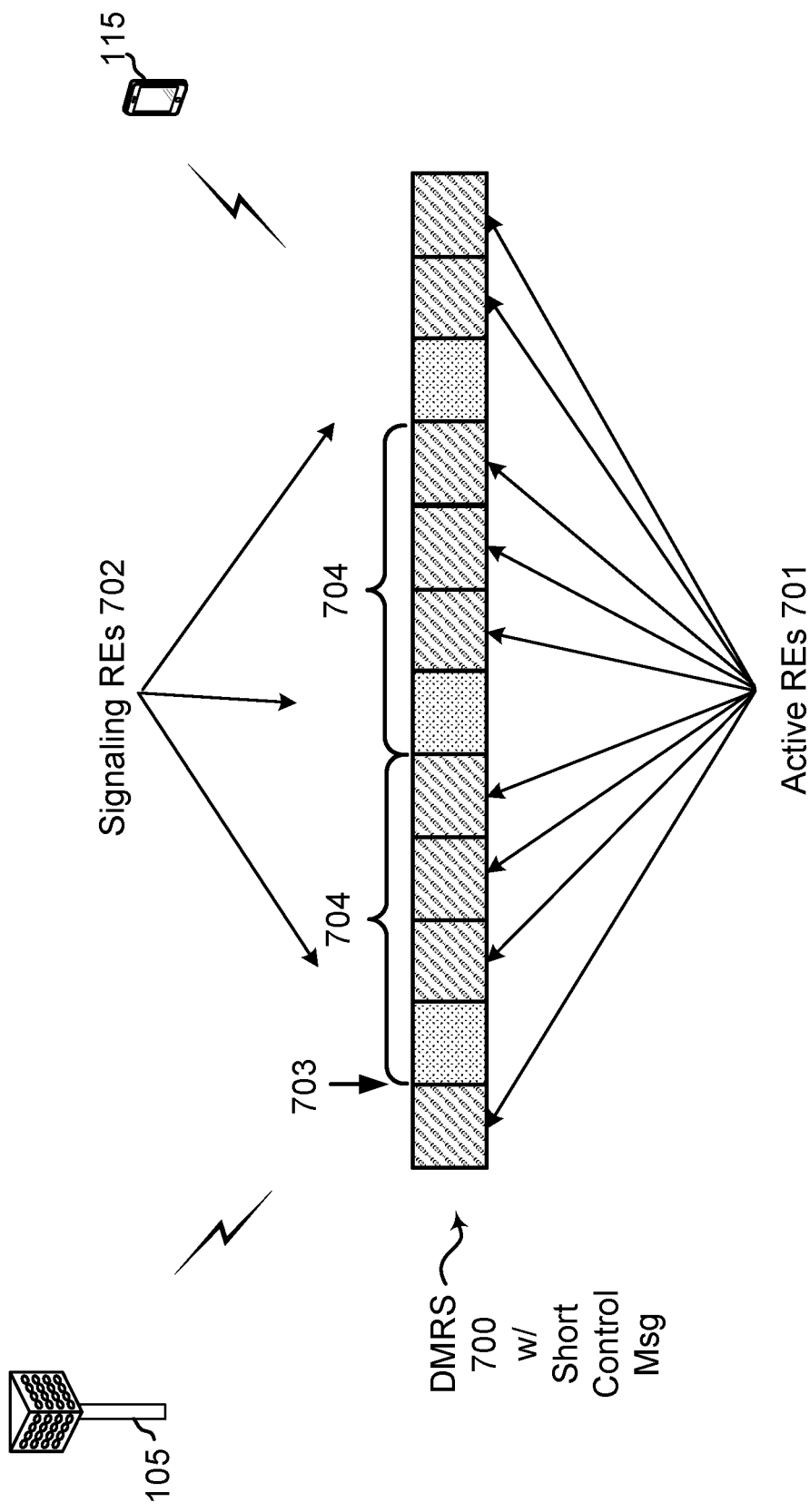
FIG. 7 is a block diagram illustrating DMRS characteristics transmitted between a base station 105 and UE 115 that provides short control messaging using index modulation on DMRS according to one or more aspects of the present disclosure.
Figure 8:
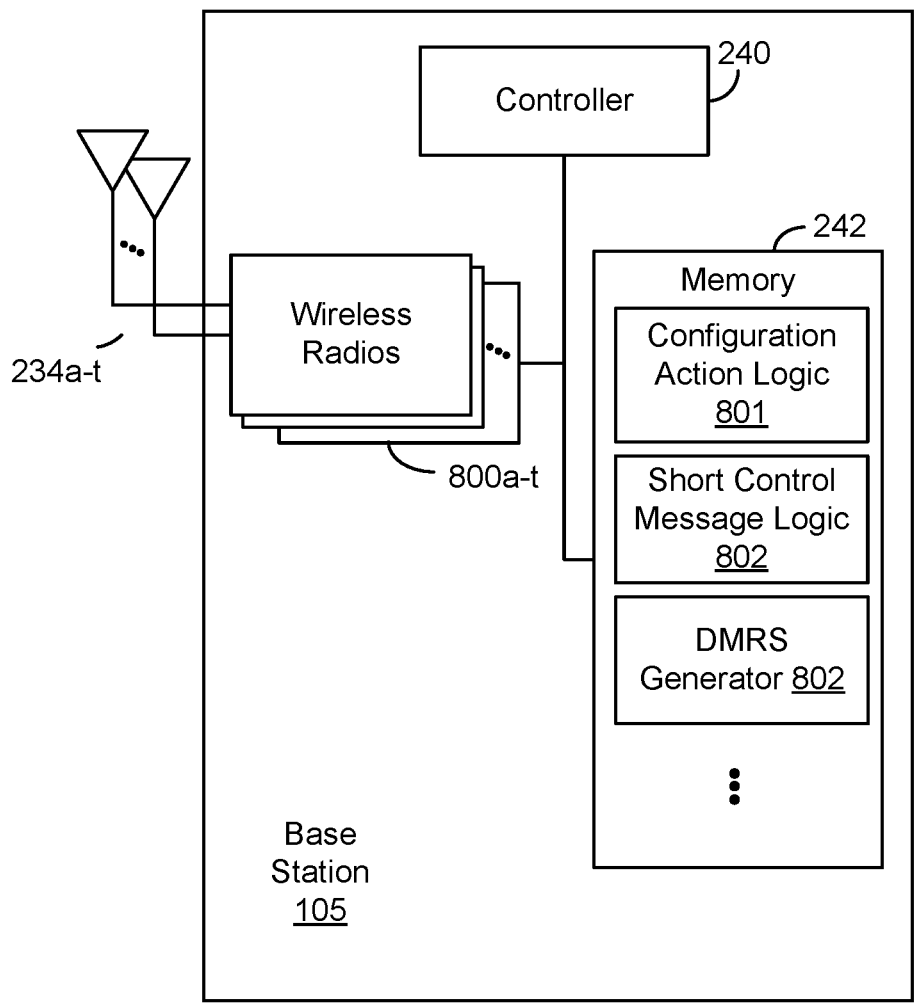
FIG. 8 is a block diagram of an example base station that supports short control messaging using index modulation on DMRS according to one or more aspects.

FIG. 7 is a block diagram illustrating DMRS characteristics transmitted between a base station 105 and UE 115 that provides short control messaging using index modulation on DMRS according to one or more aspects of the present disclosure. Base station 105 may intend to provide configuration information to address a particular configuration action at UE 115. As noted above, the configuration action may include various different actions where the configuration information may be included in a message having fewer than 10 bits. In generating DMRS 700 with a short control message, base station 105 adds a known signal waveform to signaling REs 702 in addition to the active REs 701 used for the channel estimate functionality of DMRS 700. As suggested above, correlating the known signal (e.g., DMRS pilots, etc.) with the received DMRS 700 at different RE locations of signaling REs 702 can become difficult for UE 115 due to the number of correlation possibilities. Furthermore, performing channel estimation using DMRS 700 with non-regular spacing can also become complex for UEs, such as UE 115.

In one implementation illustrated in FIG. 7, base station 105 generates DMRS 700 to include a short control message using regular spacing 704 between successive REs of signaling REs 702. Regular spacing 704 is illustrated as a period of 4 REs. However, it should be noted that various numbers of REs may be selected in order to provide regular spacing 104 (e.g., 2, 3, 5, etc.). With regular spacing 704, different sequences within DMRS 700 may be created by using different offsets, offset 703, from the beginning allocation of DMRS 700. Base station 105 may then select offset 703 in order to define the information included within the short control message.

It is noted that one or more blocks (or operations) described with reference to FIGS. 5A-5B may be combined with one or more blocks (or operations) described with reference to another of the figures. For example, one or more blocks (or operations) of FIG. 6 may be combined with one or more blocks (or operations) of FIG. 7. As another example, one or more blocks associated with FIG. 4 may be combined with one or more blocks associated with FIG. 6. As another example, one or more blocks associated with FIGS. 5A-5B may be combined with one or more blocks (or operations) associated with FIG. 1, 2, or 4. Additionally, or alternatively, one or more operations described above with reference to FIG. 1, 2, or 4 may be combined with one or more operations described with reference to FIG. 8 or 9.

In one or more aspects, techniques for supporting short control messaging using index modulation on DMRS may include additional aspects, such as any single aspect or any combination of aspects described below or in connection with one or more other processes or devices described elsewhere herein. In one or more aspects, supporting short control messaging using index modulation on DMRS may include an apparatus configured to determine a configuration action for a receiver node in communication with the network node. The apparatus is further configured to generate a short control message associated with the configuration action. The apparatus is further configured to the short control message onto a set of known inactive subcarrier REs of a DMRS sequence. The apparatus is further configured to transmit the DMRS sequence to the receiver node, wherein the DMRS sequence includes the short control message within the set of known inactive subcarrier REs of the DMRS sequence.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In one or more aspects, techniques for supporting short control messaging using index modulation on DMRS may include additional aspects, such as any single aspect or any combination of aspects described below or in connection with one or more other processes or devices described elsewhere herein. In one or more aspects, supporting short control messaging using index modulation on DMRS may include an apparatus configured to receive a DMRS from a transmitting network node. The apparatus is further configured to identify a short control message within a set of expected inactive subcarrier REs of a known sequence of the DMRS, wherein the short control message is associated with the configuration action of the network node. The apparatus is further configured to adjust a configuration of the configuration action using control information from the short control message.

Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

A first aspect of wireless communication performed by a base station includes determining, by the base station, a configuration action for a served UE in communication with the network node; generating, by the base station, a short control message associated with the configuration action; mapping, by the base station, the short control message onto a set of inactive subcarrier REs of a DMRS sequence; and transmitting, by the base station, the DMRS sequence to the served UE, wherein the DMRS sequence includes the short control message within the set of inactive subcarrier REs of the DMRS sequence.

In a second aspect, alone or in combination with the first aspect, wherein each subcarrier RE of the set of inactive subcarrier REs is spaced at a predetermined spacing.

In a third aspect, alone or in combination with one or more of the first aspect or the second aspect, wherein a first subcarrier RE of the set of inactive REs is located at an offset from a first known active subcarrier RE of the DMRS sequence.

In a fourth aspect, alone or in combination with one or more of the first aspect through the third aspect, wherein the mapping the short control message includes: selecting an initialization seed from a set of available initialization seeds associated with generation of the DMRS sequence; generating the DMRS sequence, wherein the DMRS sequences generated includes the set of inactive subcarrier REs associated with the initialization seed selected; and mapping the short control message to the set of known inactive subcarrier REs associated with the initialization seed.

In a fifth aspect, alone or in combination with one or more of the first aspect through the fourth aspect, wherein the short control message within the set of known inactive subcarrier REs of the DMRS sequence includes a DMRS pilot signal transmitted within the set of inactive subcarrier REs.

In a sixth aspect, alone or in combination with one or more of the first aspect through the fifth aspect, wherein the configuration action includes one or more of: beam management; power management; adaptive DMRS management; slot structure configuration; or configuration of ADC bits.

In a seventh aspect, alone or in combination with one or more of the first aspect through the sixth aspect, wherein the short control message is represented by fewer than 10 bits.

An eighth aspect of wireless communication performed by a UE, includes receiving, by the UE, a DMRS from a transmitting base station; identifying, by the UE, a short control message within a set of expected inactive subcarrier REs of a known sequence of the DMRS, wherein the short control message is associated with the configuration action of the network node; and adjusting, by the UE, a configuration of the configuration action using control information from the short control message.

In a ninth aspect, alone or in combination with the eighth aspect, wherein the identifying the short control message includes: correlating the known sequence of the DMRS using a plurality of available hypotheses associated with a signal location pattern of the set of expected inactive subcarrier REs; and identifying the short control message in response to the correlating.

In a tenth aspect, alone or in combination with one or more of the eighth aspect or the ninth aspect, wherein each subcarrier RE of the set of expected inactive subcarrier REs is spaced at a predetermined spacing.

In an eleventh aspect, alone or in combination with one or more of the eighth aspect through the tenth aspect, wherein a first subcarrier RE of the set of known inactive REs is located at a predetermined offset from a first expected active subcarrier RE of the DMRS sequence.

In a twelfth aspect, alone or in combination with one or more of the eighth aspect through the eleventh aspect, wherein the identifying the short control message includes: correlating the known sequence of the DMRS using a plurality of potential sequences associated with a set of available initialization seeds; and identifying the short control message in response to the correlating.

In a thirteenth aspect, alone or in combination with one or more of the eighth aspect through the twelfth aspect, wherein the short control message within the set of expected inactive subcarrier REs of the known DMRS sequence includes a DMRS pilot signal transmitted within the set of expected inactive subcarrier REs.

In a fourteenth aspect, alone or in combination with one or more of the eighth aspect through the thirteenth aspect, wherein the configuration action includes one or more of: beam management; power management; adaptive DMRS management; slot structure configuration; or configuration of ADC bits.

In a fifteenth aspect, alone or in combination with one or more of the eighth aspect through the fourteenth aspect, wherein the short control message is represented by fewer than 10 bits.

A sixteenth aspect of wireless communication by a base station including a memory storing processor-readable code; and at least one processor coupled to the memory, the at least one processor configured to execute the processor-readable code to cause the at least one processor to determine, by the base station, a configuration action for a served UE in communication with the network node; generate, by the base station, a short control message associated with the configuration action; map, by the base station, the short control message onto a set of inactive subcarrier REs of a DMRS sequence; and transmit, by the base station, the DMRS sequence to the served UE, wherein the DMRS sequence includes the short control message within the set of inactive subcarrier REs of the DMRS sequence.

In a seventeenth aspect, alone or in combination with the sixteenth aspect, wherein each subcarrier RE of the set of inactive subcarrier REs is spaced at a predetermined spacing.

In an eighteenth aspect, alone or in combination with the sixteenth aspect and the seventeenth aspect, wherein a first subcarrier RE of the set of inactive REs is located at an offset from a first known active subcarrier RE of the DMRS sequence.

In a nineteenth aspect, alone or in combination with the sixteenth aspect through the eighteenth aspect, wherein the configuration of the at least one processor to map the short control message includes configuration of the at least one processor to: select an initialization seed from a set of available initialization seeds associated with generation of the DMRS sequence; generate the DMRS sequence, wherein the DMRS sequences generated includes the set of inactive subcarrier REs associated with the initialization seed selected; and map the short control message to the set of known inactive subcarrier REs associated with the initialization seed.

In a twentieth aspect, alone or in combination with the sixteenth aspect through the nineteenth aspect, wherein the short control message within the set of known inactive subcarrier REs of the DMRS sequence includes a DMRS pilot signal transmitted within the set of inactive subcarrier REs.

In a twenty-first aspect, alone or in combination with the sixteenth aspect through the twentieth aspect, wherein the configuration action includes one or more of: beam management; power management; adaptive DMRS management; slot structure configuration; or configuration of ADC bits.

In a twenty-second aspect, alone or in combination with the sixteenth aspect through the twenty-first aspect, wherein the short control message is represented by fewer than 10 bits.

A twenty-third aspect of wireless communication by a UE includes a memory storing processor-readable code; and at least one processor coupled to the memory, the at least one processor configured to execute the processor-readable code to cause the at least one processor to: receive, by the UE, a DMRS from a transmitting base station; identify, by the UE, a short control message within a set of expected inactive subcarrier REs of a known sequence of the DMRS, wherein the short control message is associated with the configuration action of the network node; and adjust, by the UE, a configuration of the configuration action using control information from the short control message.

In a twenty-fourth aspect, alone or in combination with the twenty-third aspect, wherein the configuration of the at least one processor to identify the short control message includes configuration of the at least one processor to: correlate the known sequence of the DMRS using a plurality of available hypotheses associated with a signal location pattern of the set of expected inactive subcarrier REs; and identify the short control message in response to the correlating.

In a twenty-fifth aspect, alone or in combination with the twenty-third aspect and the twenty-fourth aspect, wherein each subcarrier RE of the set of expected inactive subcarrier REs is spaced at a predetermined spacing.

In a twenty-sixth aspect, alone or in combination with the twenty-third aspect through the twenty-fifth aspect, wherein a first subcarrier RE of the set of known inactive REs is located at a predetermined offset from a first expected active subcarrier RE of the DMRS sequence.

In a twenty-seventh aspect, alone or in combination with the twenty-third aspect through the twenty-sixth aspect, wherein the configuration of the at least one processor to identify the short control message includes configuration of the at least one processor to: correlate the known sequence of the DMRS using a plurality of potential sequences associated with a set of available initialization seeds; and identify the short control message in response to the correlation.

In a twenty-eighth aspect, alone or in combination with the twenty-third aspect through the twenty-seventh aspect, wherein the short control message within the set of expected inactive subcarrier REs of the known DMRS sequence includes a DMRS pilot signal transmitted within the set of expected inactive subcarrier REs.

In a twenty-ninth aspect, alone or in combination with the twenty-third aspect through the twenty-eighth aspect, wherein the configuration action includes one or more of: beam management; power management; adaptive DMRS management; slot structure configuration; or configuration of ADC bits.

In a thirtieth aspect, alone or in combination with the twenty-third aspect through the twenty-ninth aspect, wherein the short control message is represented by fewer than 10 bits.

A thirty-first aspect configured for wireless communication, the apparatus comprising: means for determining, by the base station, a configuration action for a served UE in communication with the network node; means for generating, by the base station, a short control message associated with the configuration action; means for mapping, by the base station, the short control message onto a set of inactive subcarrier REs of a DMRS sequence; and means for transmitting, by the base station, the DMRS sequence to the served UE, wherein the DMRS sequence includes the short control message within the set of inactive subcarrier REs of the DMRS sequence.

In a thirty-second aspect, alone or in combination with the thirty-first aspect, wherein each subcarrier RE of the set of inactive subcarrier REs is spaced at a predetermined spacing.

In a thirty-third aspect, alone or in combination with the thirty-first aspect and the thirty-second aspect, wherein a first subcarrier RE of the set of inactive REs is located at an offset from a first known active subcarrier RE of the DMRS sequence.

In a thirty-fourth aspect, alone or in combination with the thirty-first aspect through the thirty-third aspect, wherein the means for mapping the short control message includes: means for selecting an initialization seed from a set of available initialization seeds associated with generation of the DMRS sequence; means for set of inactive subcarrier REs associated with the initialization seed selected; and means for mapping the short control message to the set of known inactive subcarrier REs associated with the initialization seed.

The thirty-fifth aspect, alone or in combination with the thirty-first aspect through the thirty fourth aspect, wherein the short control message within the set of known inactive subcarrier REs of the DMRS sequence includes a DMRS pilot signal transmitted within the set of inactive subcarrier REs.

The thirty-sixth aspect, alone or in combination with the thirty-first aspect through the thirty-fifth, wherein the configuration action includes one or more of: beam management; power management; adaptive DMRS management; slot structure configuration; or configuration of ADC bits.

In a thirty-seventh aspect, alone or in combination with the thirty-first aspect through the thirty-sixth aspect, wherein the short control message is represented by fewer than 10 bits.

A thirty-eighth aspect configured for wireless communication, the apparatus comprising: means for receiving, by the UE, a DMRS from a transmitting base station; means for identifying, by the UE, a short control message within a set of expected inactive subcarrier REs of a known sequence of the DMRS, wherein the short control message is associated with the configuration action of the network node; and means for adjusting, by the UE, a configuration of the configuration action using control information from the short control message.

In a thirty-ninth aspect, alone or in combination with the thirty-eighth aspect, wherein the means for identifying the short control message includes: means for correlating the known sequence of the DMRS using a plurality of available hypotheses associated with a signal location pattern of the set of expected inactive subcarrier REs; and means for identifying the short control message in response to the correlating.

In a fortieth aspect, alone or in combination with the thirty-eighth aspect and the thirty-ninth aspect, wherein each subcarrier RE of the set of expected inactive subcarrier REs is spaced at a predetermined spacing.

In a forty-first aspect, alone or in combination with the thirty-eighth aspect through the fortieth aspect, wherein a first subcarrier RE of the set of known inactive REs is located at a predetermined offset from a first expected active subcarrier RE of the DMRS sequence.

In a forty-second aspect, alone or in combination with the thirty-eighth aspect through the forty-first aspect, wherein the means for identifying the short control message includes: means for correlating the known sequence of the DMRS using a plurality of potential sequences associated with a set of available initialization seeds; and means for identifying the short control message in response to the means for correlating.

In a forty-third aspect, alone or in combination with the thirty-eighth aspect through the forty-second aspect, wherein the short control message within the set of expected inactive subcarrier REs of the known DMRS sequence includes a DMRS pilot signal transmitted within the set of expected inactive subcarrier REs.

In a forty-fourth aspect, alone or in combination with the thirty-eighth aspect through the forty-third aspect, wherein the configuration action includes one or more of: beam management; power management; adaptive DMRS management; slot structure configuration; or configuration of ADC bits.

In a forty-fifth aspect, alone or in combination with the thirty-eighth aspect through the forty-fourth aspect, wherein the short control message is represented by fewer than 10 bits.

A forty-sixth aspect includes non-transitory computer-readable medium storing instructions that, when executed by a processor, cause the processor to perform operations comprising: determining, by the base station, a configuration action for a served UE in communication with the network node; generating, by the base station, a short control message associated with the configuration action; mapping, by the base station, the short control message onto a set of inactive subcarrier REs of a DMRS sequence; and transmitting, by the base station, the DMRS sequence to the served UE, wherein the DMRS sequence includes the short control message within the set of inactive subcarrier REs of the DMRS sequence.

In a forty-seventh aspect, alone or in combination with the forty-sixth aspect, wherein each subcarrier RE of the set of inactive subcarrier REs is spaced at a predetermined spacing.

In a forty-eighth aspect, alone or in combination with the forty-sixth aspect and the forty-seventh aspect, wherein a first subcarrier RE of the set of inactive REs is located at an offset from a first known active subcarrier RE of the DMRS sequence.

In a forty-ninth aspect, alone or in combination with the forty-sixth aspect through the forty-eighth aspect, wherein the instructions that, when executed by a processor, cause the processor to map the short control message includes instructions that, when executed by a processor, cause the processor to perform operations include: selecting an initialization seed from a set of available initialization seeds associated with generation of the DMRS sequence; generating the DMRS sequence, wherein the DMRS sequences generated includes the set of inactive subcarrier REs associated with the initialization seed selected; and mapping the short control message to the set of known inactive subcarrier REs associated with the initialization seed.

In a fiftieth aspect, alone or in combination with the forty-sixth aspect through the forty-ninth aspect, wherein the short control message within the set of known inactive subcarrier REs of the DMRS sequence includes a DMRS pilot signal transmitted within the set of inactive subcarrier REs.

In a fifty-first aspect, alone or in combination with the forty-sixth aspect through the fiftieth aspect, wherein the configuration action includes one or more of: beam management; power management; adaptive DMRS management; slot structure configuration; or configuration of ADC bits.

In a fifty-second aspect, alone or in combination with the forty-sixth aspect through the fifty-first aspect, wherein the short control message is represented by fewer than 10 bits.

A fifty-third aspect includes a non-transitory computer-readable medium storing instructions that, when executed by a processor, cause the processor to perform operations comprising: receiving, by the UE, a DMRS from a transmitting base station; identifying, by the UE, a short control message within a set of expected inactive subcarrier REs of a known sequence of the DMRS, wherein the short control message is associated with the configuration action of the network node; and adjusting, by the UE, a configuration of the configuration action using control information from the short control message.

In a fifty-fourth aspect, alone or in combination with the fifty-third aspect, wherein the wherein the instructions that, when executed by a processor, cause the processor to identify the short control message includes instructions that, when executed by a processor, cause the processor to perform operations include: correlating the known sequence of the DMRS using a plurality of available hypotheses associated with a signal location pattern of the set of expected inactive subcarrier REs; and identifying the short control message in response to the correlating.

In a fifty-fifth aspect, alone or in combination with the fifty-third aspect and the fifty-fourth aspect, wherein each subcarrier RE of the set of expected inactive subcarrier REs is spaced at a predetermined spacing.

In a fifty-sixth aspect, alone or in combination with the fifty-third aspect through the fifty-fifth aspect, wherein a first subcarrier RE of the set of known inactive REs is located at a predetermined offset from a first expected active subcarrier RE of the DMRS sequence.

In a fifty-seventh aspect, alone or in combination with the fifty-third aspect through the fifty-sixth aspect, wherein the instructions that, when executed by a processor, cause the processor to identify the short control message includes instructions that, when executed by a processor, cause the processor to perform operations include: correlating the known sequence of the DMRS using a plurality of potential sequences associated with a set of available initialization seeds; and identifying the short control message in response to the correlating.

In a fifty-eighth aspect, alone or in combination with the fifty-third aspect through the fifty-seventh aspect, wherein the short control message within the set of expected inactive subcarrier REs of the known DMRS sequence includes a DMRS pilot signal transmitted within the set of expected inactive subcarrier REs.

In a fifty-ninth aspect, alone or in combination with the fifty-third aspect through the fifty-eighth aspect, wherein the configuration action includes one or more of: beam management; power management; adaptive DMRS management; slot structure configuration; or configuration of ADC bits.

In a sixtieth aspect, alone or in combination with the fifty-third aspect through the fifty-ninth aspect, wherein the short control message is represented by fewer than 10 bits.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a base station, the method comprising:
   determining, by the base station, a configuration action for a served user equipment (UE) in communication with a network node;
   generating, by the base station, a short control message associated with the configuration action;
   mapping, by the base station, the short control message onto a set of inactive subcarrier resource elements (REs) of a demodulation reference signal (DMRS) sequence;
   transmitting, by the base station, the DMRS sequence to the served UE, wherein the DMRS sequence includes the short control message within the set of inactive subcarrier REs of the DMRS sequence; and
   wherein the mapping the short control message includes:
      selecting an initialization seed from a set of available initialization seeds associated with generation of the DMRS sequence;
      generating the DMRS sequence, wherein the DMRS sequences generated includes the set of inactive subcarrier REs associated with the initialization seed selected; and
      mapping the short control message to the set of known inactive subcarrier REs associated with the initialization seed.

2. The method of claim 1, wherein each subcarrier RE of the set of inactive subcarrier REs is spaced at a predetermined spacing.

3. The method of claim 2, wherein a first subcarrier RE of the set of inactive REs is located at an offset from a first known active subcarrier RE of the DMRS sequence.

4. The method of claim 1, wherein the short control message within the set of known inactive subcarrier REs of the DMRS sequence includes a DMRS pilot signal transmitted within the set of inactive subcarrier REs.

5. The method of claim 1, wherein the configuration action includes one or more of:
   beam management;
   power management;
   adaptive DMRS management;
   slot structure configuration; or
   configuration of analog-to-digital converter (ADC) bits.

6. The method of claim 1, wherein the short control message is represented by fewer than 10 bits.

7. A method of wireless communication performed by a user equipment (UE), the method comprising:
   receiving, by the UE, a demodulation reference signal (DMRS) from a transmitting base station;
   identifying, by the UE, a short control message within a set of expected inactive subcarrier resource elements (REs) of a known sequence of the DMRS, wherein the short control message is associated with a configuration action of a network node;
   adjusting, by the UE, a configuration of the configuration action using control information from the short control message; and
   wherein the identifying the short control message includes:
      correlating the known sequence of the DMRS using a plurality of potential sequences associated with a set of available initialization seeds; and
      identifying the short control message in response to the correlating.

8. The method of claim 7, wherein each subcarrier RE of the set of expected inactive subcarrier REs is spaced at a predetermined spacing.

9. The method of claim 8, wherein a first subcarrier RE of the set of known inactive REs is located at a predetermined offset from a first expected active subcarrier RE of the DMRS sequence.

10. The method of claim 7, wherein the short control message within the set of expected inactive subcarrier REs of the known DMRS sequence includes a DMRS pilot signal transmitted within the set of expected inactive subcarrier REs.

11. The method of claim 7, wherein the configuration action includes one or more of:
   beam management;
   power management;
   adaptive DMRS management;
   slot structure configuration; or
   configuration of analog-to-digital converter (ADC) bits.

12. The method of claim 7, wherein the short control message is represented by fewer than 10 bits.

13. A base station comprising:
   a memory storing processor-readable code; and
   at least one processor coupled to the memory, the at least one processor configured to execute the processor-readable code to cause the at least one processor to:
      determine, by the base station, a configuration action for a served user equipment (UE) in communication with a network node;
      generate, by the base station, a short control message associated with the configuration action;
      map, by the base station, the short control message onto a set of inactive subcarrier resource elements (REs) of a demodulation reference signal (DMRS) sequence;
      transmit, by the base station, the DMRS sequence to the served UE, wherein the DMRS sequence includes the short control message within the set of inactive subcarrier REs of the DMRS sequence; and
   wherein to map the short control message the at least one processor is configured to:
      select an initialization seed from a set of available initialization seeds associated with generation of the DMRS sequence;

generate the DMRS sequence, wherein the DMRS sequences generated includes the set of inactive subcarrier REs associated with the initialization seed selected; and map the short control message to the set of known inactive subcarrier REs associated with the initialization seed.

14. The base station of claim 13, wherein each subcarrier RE of the set of inactive subcarrier REs is spaced at a predetermined spacing.

15. The base station of claim 14, wherein a first subcarrier RE of the set of inactive REs is located at an offset from a first known active subcarrier RE of the DMRS sequence.

16. The base station of claim 13, wherein the short control message within the set of known inactive subcarrier REs of the DMRS sequence includes a DMRS pilot signal transmitted within the set of inactive subcarrier REs.

17. The base station of claim 13, wherein the configuration action includes one or more of:
beam management;
power management;
adaptive DMRS management;
slot structure configuration; or
configuration of analog-to-digital converter (ADC) bits.

18. The base station of claim 13, wherein the short control message is represented by fewer than 10 bits.

19. A user equipment (UE) comprising:
a memory storing processor-readable code; and
at least one processor coupled to the memory, the at least one processor configured to execute the processor-readable code to cause the at least one processor to:
receive, by the UE, a demodulation reference signal (DMRS) from a transmitting base station;
identify, by the UE, a short control message within a set of expected inactive subcarrier resource elements (REs) of a known sequence of the DMRS, wherein the short control message is associated with a configuration action of a network node;
adjust, by the UE, a configuration of the configuration action using control information from the short control message; and
wherein to identify the short control message the at least one processor is configured to:
correlate the known sequence of the DMRS using a plurality of potential sequences associated with a set of available initialization seeds; and
identify the short control message in response to the correlation.

20. The UE of claim 19, wherein each subcarrier RE of the set of expected inactive subcarrier REs is spaced at a predetermined spacing.

21. The UE of claim 20, wherein a first subcarrier RE of the set of known inactive REs is located at a predetermined offset from a first expected active subcarrier RE of the DMRS sequence.

22. The UE of claim 19, wherein the short control message within the set of expected inactive subcarrier REs of the known DMRS sequence includes a DMRS pilot signal transmitted within the set of expected inactive subcarrier REs.

23. The UE of claim 19, wherein the configuration action includes one or more of:
beam management;
power management;
adaptive DMRS management;
slot structure configuration; or
configuration of analog-to-digital converter (ADC) bits.

24. The UE of claim 19, wherein the short control message is represented by fewer than 10 bits.

25. An apparatus configured for wireless communication, the apparatus comprising:
means for determining, by the base station, a configuration action for a served user equipment (UE) in communication with a network node;
means for generating, by the base station, a short control message associated with the configuration action;
means for mapping, by the base station, the short control message onto a set of inactive subcarrier resource elements (REs) of a demodulation reference signal (DMRS) sequence;
means for transmitting, by the base station, the DMRS sequence to the served UE, wherein the DMRS sequence includes the short control message within the set of inactive subcarrier REs of the DMRS sequence; and
wherein the means for mapping the short control message includes:
means for selecting an initialization seed from a set of available initialization seeds associated with generation of the DMRS sequence;
means for setting of inactive subcarrier REs associated with the initialization seed selected; and
means for mapping the short control message to the set of known inactive subcarrier REs associated with the initialization seed.

26. The apparatus of claim 25, wherein each subcarrier RE of the set of inactive subcarrier REs is spaced at a predetermined spacing.

27. The apparatus of claim 26, wherein a first subcarrier RE of the set of inactive REs is located at an offset from a first known active subcarrier RE of the DMRS sequence.

28. The apparatus of claim 25, wherein the short control message within the set of known inactive subcarrier REs of the DMRS sequence includes a DMRS pilot signal transmitted within the set of inactive subcarrier REs.

29. The apparatus of claim 25, wherein the configuration action includes one or more of:
beam management;
power management;
adaptive DMRS management;
slot structure configuration; or
configuration of analog-to-digital converter (ADC) bits.

30. The apparatus of claim 25, wherein the short control message is represented by fewer than 10 bits.

31. An apparatus configured for wireless communication, the apparatus comprising:
means for receiving, by the UE, a demodulation reference signal (DMRS) from a transmitting base station;
means for identifying, by the UE, a short control message within a set of expected inactive subcarrier resource elements (REs) of a known sequence of the DMRS, wherein the short control message is associated with a configuration action of a network node;
means for adjusting, by the UE, a configuration of the configuration action using control information from the short control message; and
wherein the means for identifying the short control message includes:
means for correlating the known sequence of the DMRS using a plurality of potential sequences associated with a set of available initialization seeds; and
means for identifying the short control message in response to the means for correlating.

32. The apparatus of claim 31, wherein each subcarrier RE of the set of expected inactive subcarrier REs is spaced at a predetermined spacing.

33. The apparatus of claim 32, wherein a first subcarrier RE of the set of known inactive REs is located at a predetermined offset from a first expected active subcarrier RE of the DMRS sequence.

34. The apparatus of claim 31, wherein the short control message within the set of expected inactive subcarrier REs of the known DMRS sequence includes a DMRS pilot signal transmitted within the set of expected inactive subcarrier REs.

35. The apparatus of claim 31, wherein the configuration action includes one or more of:
  beam management;
  power management;
  adaptive DMRS management;
  slot structure configuration; or
  configuration of analog-to-digital converter (ADC) bits.

36. The apparatus of claim 31, wherein the short control message is represented by fewer than 10 bits.

37. A non-transitory computer-readable medium storing instructions that, when executed by a processor, cause the processor to perform operations comprising:
  determining, by the base station, a configuration action for a served user equipment (UE) in communication with a network node;
  generating, by the base station, a short control message associated with the configuration action;
  mapping, by the base station, the short control message onto a set of inactive subcarrier resource elements (REs) of a demodulation reference signal (DMRS) sequence;
  transmitting, by the base station, the DMRS sequence to the served UE, wherein the DMRS sequence includes the short control message within the set of inactive subcarrier REs of the DMRS sequence; and
  wherein to map the short control message the operations include:
    selecting an initialization seed from a set of available initialization seeds associated with generation of the DMRS sequence;
    generating the DMRS sequence, wherein the DMRS sequences generated includes the set of inactive subcarrier REs associated with the initialization seed selected; and
    mapping the short control message to the set of known inactive subcarrier REs associated with the initialization seed.

38. The non-transitory computer-readable medium of claim 37, wherein each subcarrier RE of the set of inactive subcarrier REs is spaced at a predetermined spacing.

39. The non-transitory computer-readable medium of claim 38, wherein a first subcarrier RE of the set of inactive REs is located at an offset from a first known active subcarrier RE of the DMRS sequence.

40. The non-transitory computer-readable medium of claim 37, wherein the short control message within the set of known inactive subcarrier REs of the DMRS sequence includes a DMRS pilot signal transmitted within the set of inactive subcarrier REs.

41. The non-transitory computer-readable medium of claim 37, wherein the configuration action includes one or more of:
  beam management;
  power management;
  adaptive DMRS management;
  slot structure configuration; or
  configuration of analog-to-digital converter (ADC) bits.

42. The non-transitory computer-readable medium of claim 37, wherein the short control message is represented by fewer than 10 bits.

43. A non-transitory computer-readable medium storing instructions that, when executed by a processor, cause the processor to perform operations comprising:
  receiving, by the UE, a demodulation reference signal (DMRS) from a transmitting base station;
  identifying, by the UE, a short control message within a set of expected inactive subcarrier resource elements (REs) of a known sequence of the DMRS, wherein the short control message is associated with a configuration action of a network node; and
  adjusting, by the UE, a configuration of the configuration action using control information from the short control message; and
  wherein to identify the short control message the operations include:
    correlating the known sequence of the DMRS using a plurality of potential sequences associated with a set of available initialization seeds; and
    identifying the short control message in response to the correlating.

44. The non-transitory computer-readable medium of claim 43, wherein each subcarrier RE of the set of expected inactive subcarrier REs is spaced at a predetermined spacing.

45. The non-transitory computer-readable medium of claim 44, wherein a first subcarrier RE of the set of known inactive REs is located at a predetermined offset from a first expected active subcarrier RE of the DMRS sequence.

46. The non-transitory computer-readable medium of claim 43, wherein the short control message within the set of expected inactive subcarrier REs of the known DMRS sequence includes a DMRS pilot signal transmitted within the set of expected inactive subcarrier REs.

47. The non-transitory computer-readable medium of claim 43, wherein the configuration action includes one or more of:
  beam management;
  power management;
  adaptive DMRS management;
  slot structure configuration; or
  configuration of analog-to-digital converter (ADC) bits.

48. The non-transitory computer-readable medium of claim 43, wherein the short control message is represented by fewer than 10 bits.

* * * * *